Feb. 23, 1932.  C. H. JOHNSON  1,846,490
GLARE SHIELD ACTUATOR
Filed Jan. 29, 1930

INVENTOR.
Charles H. Johnson
BY
Townsend, Loftus & Stott
ATTORNEYS.

Patented Feb. 23, 1932

1,846,490

UNITED STATES PATENT OFFICE

CHARLES H. JOHNSON, OF SACRAMENTO, CALIFORNIA

GLARE SHIELD ACTUATOR

Application filed January 29, 1930. Serial No. 424,285.

This invention relates to glare shields designed for use in connection with windshields of automobiles and like vehicles for the purpose of shielding the driver's eyes from the glare of sun, headlights of approaching automobiles, etc., and especially to an actuator whereby the glare shield may be quickly and readily lowered into the driver's line of vision or raised so as to leave a free and unobstructed view.

The object of the present invention is to generally improve and simplify the construction and operation of glare shields of the character described; to provide an electromagnetically operated actuator whereby the glare shield may be lowered into or out of the line of vision; and further, to provide a switch mechanism so positioned that an electric circuit may be closed through the operating magnet without the driver removing his or her hands from the steering wheel while driving.

Figure 1:
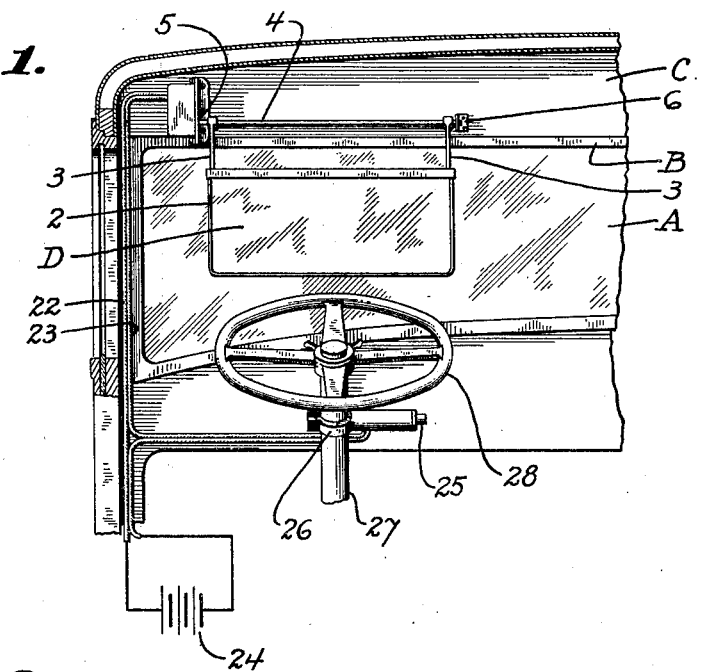
Figure 2:
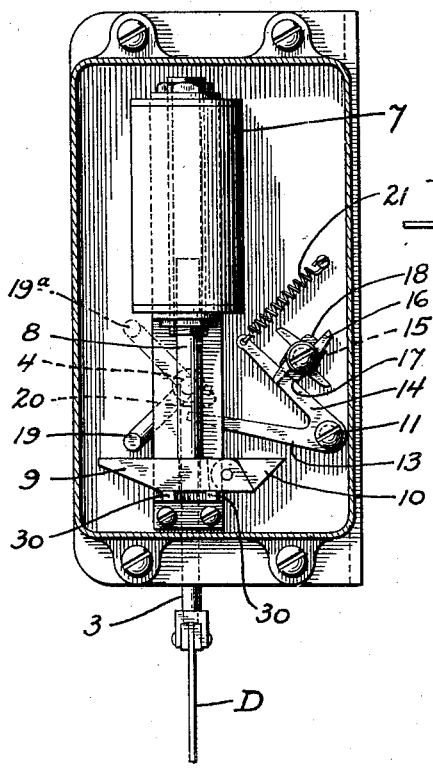
Figure 3:
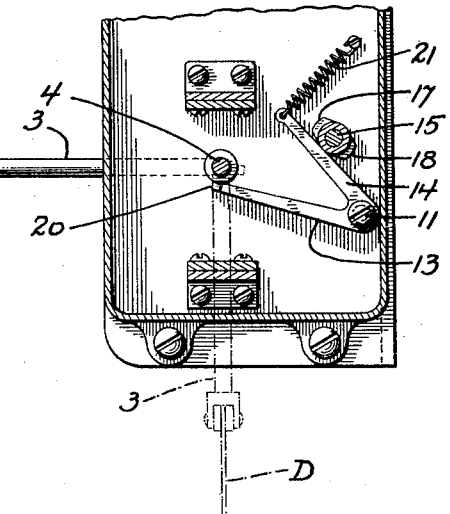

The glare shield together with the actuating mechanism is shown by way of illustration in the accompanying drawings, in which:

Fig. 1 is a front view of the glare shield and its actuating mechanism as applied to the windshield of an automobile, Fig. 2 is an end view of the actuating mechanism, and Fig. 3 is a detailed view of a portion of the actuating mechanism.

Referring to the drawings in detail and particularly Figs. 1 and 2, A indicates a windshield of an automobile, B a portion of the windshield frame, C a panel mounted above the same, and D a glare shield. This shield is constructed of any suitable semi-transparent material, such as celluloid or the like, and it is secured in a frame 2 carried by a pair of arms 3 which are secured to a shaft 4. This shaft is journalled in brackets such as indicated at 5 and 6 and the bracket 5 also functions as a support for the actuating mechanism, this mechanism consists of a solenoid magnet 7 provided with an armature or plunger 8. Secured on the lower end of the armature is an operating bar 9 and pivotally mounted on one end thereof is a pawl 10. Pivotally secured as at 11 to one side of the operating bar is a lever consisting of two arms such as shown at 13 and 14, this lever will hereinafter be referred to as the actuating lever as it functions both as a tripping lever and a locking lever. Secured at a point directly above the actuating lever is a shaft 15 and rotatably mounted thereon is a four point star wheel such as shown at 16 and a cam having two points or rises thereon as shown at 17 and 18, the cam and star wheel being connected so as to rotate in unison as will hereinafter be described.

Shaft 4 supporting the glare shield extends through the bracket 5 and has a crank arm 19 formed on its inner end. Also secured on the shaft adjacent the crank or in alignment therewith is a pin 20 which is adapted to be locked or released by means of the arm 13 of the actuating lever, the actuating lever being maintained in engagement with the pin 20 and also with one or another of the cams 17 or 18 by means of a spring 21.

The solenoid magnet is connected by means of a pair of wires 22 and 23 with the battery 24 or other suitable source of current supply and with a push button switch 25. This switch is secured by means of a clamp 26 to the steering column 27 of the automobile at a point just below the steering wheel indicated at 28. The driver can depress the button 25 without releasing his hands from the steering wheel by merely extending one of the fingers and pushing the button. The circuit is closed when the push button is depressed and magnet 7 is energized, this causes an upward movement of the armature 8 and the operating bar 9. The crank arm 19 is thus engaged and it is raised to the dotted line position indicated at 19a. Pawl 10 at the same time engages the star wheel 16 and rotates it a quarter revolution thus bringing one of the cams 17 or 18 out of alignment with arm 14 of the actuating lever. The actuating lever is thus moved from the full line position shown in Fig. 2 to the full line position shown in Fig. 3, or at a point directly behind the pin 20, thus retaining crank arm 19 in the raised position shown at 19a when the magnet is deenergized, as deenergization of the magnet permits the armature 8 on the operating bar to drop to inoperative position shown in Fig. 2 where it is supported by a pair of bars 30. The glare shield being secured to shaft 4 will in that instance assume a horizontal position or a raised position above the windshield, thus leaving the windshield free and unobstructed as far as vision is concerned. If sun glare bothers the driver or headlights on an approaching car tend to glare his vision, he merely depresses the button 25 again causing energization of the magnet. A second energization causes the armature 8 and operating bar 9 to be raised and pawl 10 will thus engage one of the arms on the star wheel and rotate it a quarter of a revolution, hence bringing one of the cams 17 or 18 into engagement with arm 14 of the actuating lever. The actuating lever is thus swung from the full line position shown in Fig. 3 to the full line position shown in Fig. 2, thereby releasing pin 20 on shaft 4 and thus permitting the crank arm 19 to swing back to the position shown in Fig. 2, and as crank arm 19 forms a part of shaft 4 the glare shield D will also swing with the shaft and drop down into the position shown in Fig. 1 where it is interposed in the line of vision of the driver thus dimming out any glare or annoying sunlight. The glare shield is comparatively small hence leaving all other portions of the windshield free and unobstructed. Even though it is small it is more or less annoying to have it placed in the line of vision except when glaring lights are encountered, hence it is desirable that means be provided for quickly moving it into or out of the line of vision. Such means have been provided as the mere depression of the button 25 will either cause release of the glare shield permitting it to drop by gravity into the line of vision or causing raising thereof to a horizontal position where it leaves the windshield free and unobstructed. In other words, one energization of the magnet raises the glare shield while the second energization of the magnet releases the actuating lever and thereby the glare shield, thus permitting it to drop by gravity into the line of vision and it is accomplished by the mere depression of the button 25 and without any necessity of the driver removing his or her hands from the steering wheel and in fact without taking the eyes off the road or in any way disturbing the attention of the driver.

While the actuating mechanism as a whole has been described in conjunction with the glare shield, it is obvious that it may be used for other purposes, for instance, that of intermittently imparting a swinging motion to a windshield wiper or that of actuating a signaling arm and other analogous uses, and while certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. In a device of the character described, an electromagnet, an armature actuated thereby, an operating pawl pivotally mounted on the armature and movable in unison therewith, a star wheel adapted to be engaged by the pawl and intermittently rotated thereby, an oscillatory actuating lever adapted to assume two different positions, and a cam member co-operating with the star wheel and engaging with the actuating lever to oscillate the lever and swing it from one position to another as the circuit of the magnet is opened and closed.

2. In combination with a pivoted arm adapted to be swung from a vertical to a horizontal position, an electromagnet, an armature movable upon energization of the magnet, an actuating bar carried by the armature and engageable with said arm to raise it to a horizontal position, latch means engageable with the arm to maintain it in a horizontal position, said actuating bar also being engageable with said latch means to release the same upon a second energization of the magnet.

3. In combination with a pivoted arm adapted to be swung from a vertical to a horizontal position, an electromagnet, an armature movable upon energization of the magnet, an actuating bar carried by the armature and engageable with said arm to raise it to a horizontal position, latch means engageable with the arm to maintain it in a horizontal position, a pawl carried by the actuating bar and engageable with said latch means to move the same into and out of engagement with the arm alternately upon energization of the magnet.

CHARLES H. JOHNSON.